United States Patent
Mori et al.

(10) Patent No.: US 8,330,857 B2
(45) Date of Patent: Dec. 11, 2012

(54) DISPLAY APPARATUS AND CONTROL METHOD THEREOF

(75) Inventors: Tomokazu Mori, Yokohama (JP); Kazuhiko Nakazawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 397 days.

(21) Appl. No.: 12/765,523

(22) Filed: Apr. 22, 2010

(65) Prior Publication Data

US 2010/0271545 A1  Oct. 28, 2010

(30) Foreign Application Priority Data

Apr. 28, 2009 (JP) ................... 2009-109645

(51) Int. Cl.
*H04N 7/01* (2006.01)
(52) U.S. Cl. ...................... 348/441; 348/459
(58) Field of Classification Search .............. 348/441, 348/448, 451–452, 458–459, 699–701, 97, 348/443, 445; *H04N 7/01*
See application file for complete search history.

(56) References Cited

U.S. PATENT DOCUMENTS

| | | | |
|---|---|---|---|
| 5,060,059 A | 10/1991 | Mori et al. | 358/79 |
| 5,117,284 A | 5/1992 | Mori et al. | 358/79 |
| 5,253,048 A | 10/1993 | Mori et al. | 358/524 |
| 6,111,610 A * | 8/2000 | Faroudja | 348/441 |
| 6,222,589 B1 * | 4/2001 | Faroudja et al. | 348/448 |
| 7,432,979 B2 * | 10/2008 | Tanaka | 348/448 |
| 7,796,192 B2 * | 9/2010 | Itoh et al. | 348/452 |
| 8,228,427 B2 * | 7/2012 | Mori et al. | 348/441 |

FOREIGN PATENT DOCUMENTS

JP  2003-046857  2/2003

* cited by examiner

*Primary Examiner* — Trang U Tran
(74) *Attorney, Agent, or Firm* — Fitzpatrick, Cella, Harper & Scinto

(57) ABSTRACT

A display apparatus includes a conversion unit for converting first video data having a first frame rate to second video data having a second frame rate which is "n" times as high as the first frame rate ("n" being an integer of two or larger), and a display unit for displaying the second video data. When the first video data is video data of two successive frame images having different brightnesses, the conversion unit performs a first frame rate converting process for converting the first video data to the second video data by outputting a frame image group made of two successive frame images in the first video data "n" times in a row at the second frame rate. Consequently, the frame rate converting process can be performed without causing a deterioration of a visual effect such as an HDR effect, and a viewing environment comfortable for the user can be realized.

10 Claims, 11 Drawing Sheets t0~t2 t2~t4 t4~t6 t6~t8 t8~t10 t10~t12

PRIOR ART

DISPLAY APPARATUS AND CONTROL METHOD THEREOF

BACKGROUND OF THE INVENTION

1. Field of the Invention

The present invention relates to a display apparatus and a control method thereof.

2. Description of the Related Art

As an apparatus for generating an image, there is a digital camera using a general imaging element such as CMOS or CCD. However, the dynamic range of a general imaging element such as CMOS or CCD is narrow and is at most about 50 to 70 decibels. It is consequently difficult for such a digital camera to generate an image expressing brightness as seen by the eyes of a human. For example, when scenery with high contrast is photographed by a digital camera, a dark part is blocked up, and a bright part is blown out.

A technique for solving the problem is disclosed in, for example, Japanese Patent Application Laid-Open (JP-A) No. 2003-46857. More specifically, in the technique disclosed in Japanese Patent Application Laid-Open (JP-A) No. 2003-46857, a correct exposure part is extracted from each of a generally darker image (underexposed image) and a generally lighter image (overexposed image) as compared with an image with correct exposure (correct brightness). By synthesizing the extracted correct exposure parts, an image having a high dynamic range is obtained. Such a technique is called high dynamic range (HDR) image synthesis or the like. By performing the HDR image synthesis, an image relatively closer to what a human sees than an original image (an image obtained at the time of photographing) can be obtained. Generally, in an overexposed image, the gradation of a dark part is expressed finer as compared with an image of the correct exposure. In an underexposed image, the gradation of a light part is expressed finer as compared with an image of the correct exposure.

On the other hand, by alternately displaying two images having the same content and different brightnesses instead of the image synthesis as described above, the apparent dynamic range can be improved.

For example, overexposed and underexposed images each having gradation of 10 bits are alternately displayed on a display at a frame rate of a predetermined value or higher (for example, 120 fps). It can make the eyes of a human recognize an image having gradation of 11 bits.

According to the method, the HDR effect (an effect equivalent to that produced when HDR image synthesis is performed) can be obtained. The technique of improving the apparent dynamic range by alternately displaying two images having the same content and different brightnesses as described above will be called a pseudo HDR technique. When images are stored in a video output apparatus such as a camera or a PC, it is sufficient to alternately transmit the two images having the same content and different brightnesses to a display apparatus such as a television at a frame rate which is a predetermined value or higher. The video output apparatus and the display apparatus are connected to each other via, for example, a video transmission path such as an HDMI (High-Definition Multimedia Interface) cable.

Many digital televisions of recent years have a so-called frame rate conversion (FRC) function of generating video data capable of expressing smoother movement by converting the frame rate of input video data by "n" times as fast. FIGS. 11A and 11B are diagrams illustrating an example of the conventional frame rate converting process showing an example of converting video data of 60 fps to video data of 120 fps and then outputting the video of 120 fps.

In FIG. 11A, the frame rate converting process is performed by repeatedly outputting each input frame image by "r" times (r: an integer of r≧2). FIG. 11A illustrates the case where r=2. The method is effective when video data (input video signal, input video data) is a still image, and in the case where the video data is a moving image to which it is difficult to perform frame interpolation by motion compensation.

In FIG. 11B, the frame rate converting process is performed by calculating motion information (motion vector) from the two successive frame images and generating an interpolating image based on the motion information. This method is effective when the input video data includes a moving image.

By using such a method, a smoother video can be displayed on a display having a frame rate higher than that of the input video data.

However, when performing the frame rate converting process shown in FIGS. 11A and 11B on the pseudo HDR video data, a problem arises. The pseudo HDR video data is video data which successively gives two frame images having the same content and different brightnesses (for example, a frame of an overexposed image and a frame of an underexposed image). More specifically, when performing the frame rate converting process shown in FIG. 11A on the pseudo HDR video data, the frame images in the video data to be output are arranged like "light, light, dark, dark, light, . . . ". When performing the frame rate converting process shown in FIG. 11B on the pseudo HDR video data, the frame images in the video data to be output are arranged like "light, correct, dark, correct, light, . . . ". Consequently, intended pseudo HDR effect (the HDR effect obtained by the pseudo HDR video data) cannot be obtained. "Light" refers to a frame of an overexposed image ("+" in the diagram), "dark" refers to a frame of an underexposed image ("−" in the diagram), and "correct" refers to a frame of an image with the correct exposure.

SUMMARY OF THE INVENTION

Therefore, the present invention provides a display apparatus and a control method thereof capable of performing a frame rate converting process without causing a deterioration of a visual effect such as the HDR effect and realizing a viewing environment that is comfortable for a user.

The first aspect of the present invention is a display apparatus comprising:

a conversion unit for converting first video data having a first frame rate to second video data having a second frame rate, wherein the second frame rate is "n" times as high as the first frame rate ("n" is an integer of two or larger); and a display unit for displaying the second video data, wherein, when the first video data is video data of two successive frame images having different brightnesses, the conversion unit performs a first frame rate converting process for converting the first video data to the second video data by outputting a frame image group made of two successive frame images in the first video data "n" times in a row at the second frame rate.

The second aspect of the present invention is a display apparatus comprising:

a conversion unit for converting first video data having a first frame rate to second video data having a second frame rate, wherein the second frame rate is "n" times as high as the first frame rate ("n" is an integer of two or larger); and a display unit for displaying the second video data, wherein, when the first video data is video data of two successive frame images having different brightnesses, the conversion unit performs a second frame rate converting process for converting the first video data to the second video data by outputting an i-th (i is an integer of one or larger) frame image and an i+1th frame image in the first video data in order at the second frame rate, and then, performing a process for generating two interpolation frame images respectively from a frame image pair made of the i-th frame image and the i+2th frame image of the first video data and a frame image pair of the i+1th frame image and the i+3th frame image of the first image data and outputting the two interpolation frame images n−1 times in order at the second frame rate.

According to the present invention, a display apparatus and a control method thereof capable of performing a frame rate converting process without causing a deterioration of a visual effect such as the HDR effect and realizing a viewing environment that is comfortable for a user can be provided.

Further features of the present invention will become apparent from the following description of exemplary embodiments with reference to the attached drawings.

DESCRIPTION OF THE EMBODIMENTS

Example 1

Example 1 of a display apparatus and a control method thereof according to an embodiment of the invention will be described below with reference to the drawings.

Figure 1:
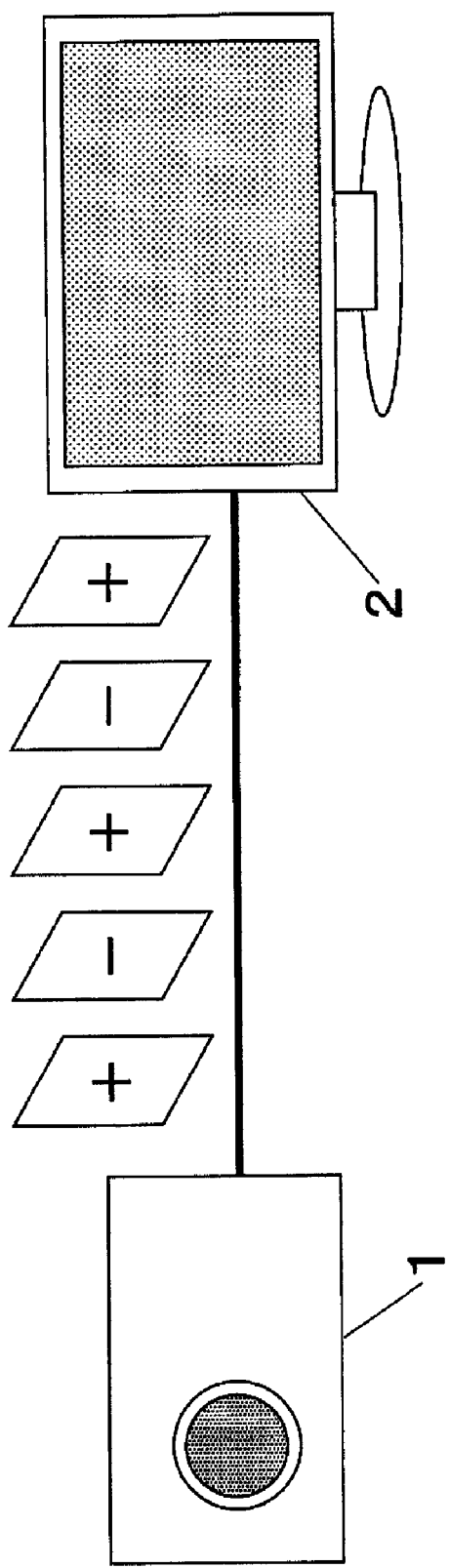
FIG. 1 is a diagram illustrating an example of a display apparatus and a video output apparatus according to an embodiment.

FIG. 1 is a diagram illustrating an example of a display apparatus (video display apparatus) according to the embodiment and a video output apparatus for outputting video data to the display apparatus. In the embodiment, the video output apparatus is a digital camera 1 having a video data output terminal, and the display apparatus is a television 2 having a video data input terminal. The digital camera 1 and the television 2 are connected to each other via an HDMI cable.

Figure 2:
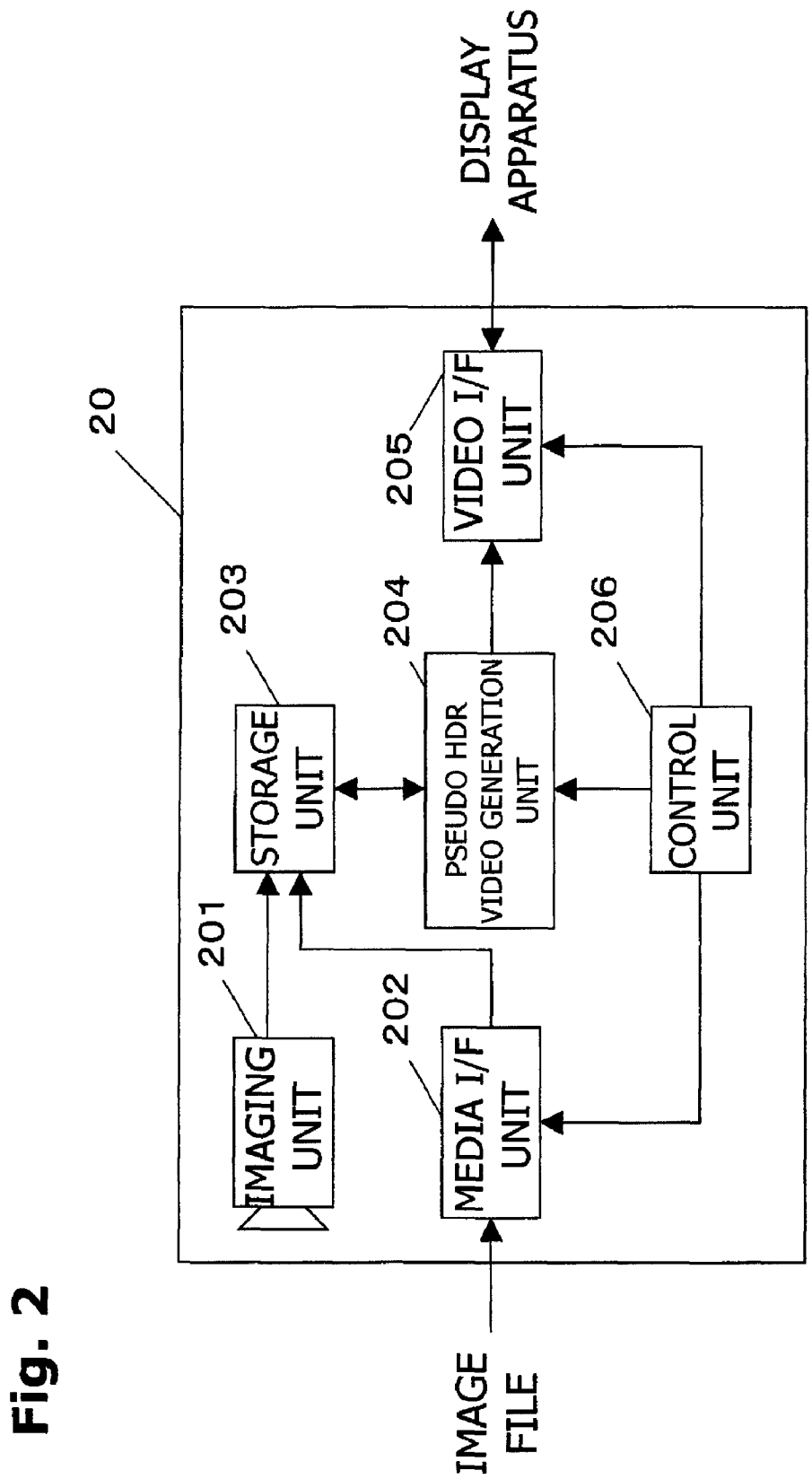
FIG. 2 is a diagram illustrating a schematic configuration of the video output apparatus according to the embodiment.

FIG. 2 is a block diagram illustrating a schematic configuration of the digital camera 1 (an imaging apparatus 20; a video output apparatus).

An imaging unit 201 includes an imaging element such as CCD or CMOS and a lens, forms an image with the imaging element from incident light, and converts the light to an electrical signal.

A media I/F unit 202 reads an image file to be reproduced from a recording medium such as a memory card, a DVD, or a hard disk, and outputs the image file to a storage unit 203.

In the storage unit 203, image files (for example, image data of an overexposed image and an underexposed image) to be reproduced which are captured beforehand or copied from an external device are recorded.

Henceforth, a unit of two pieces of the image data having the same content and different brightnesses will be called a pseudo HDR file. The pseudo HDR file may be an image file in which image data is independent of each other (for example, JPEG) or an image file in which two pieces of image data are combined as a single file in a format supporting a multi-page file (for example, TIFF).

A pseudo HDR video generation unit 204 generates video data which successively produces pseudo HDR files designated by a user (pseudo HDR video data), for example, video data in which frame images are arranged like "light, dark, light, dark, light, . . . ". It is assumed that the video data generated by the pseudo HDR video generation unit 204 has a first frame rate. "Light" expresses a frame of an overexposed image, and "dark" expresses a frame of an underexposed image.

When the start of transmission of the pseudo HDR video data is instructed by the user, a video I/F unit 205 transmits a transmission start command indicative of the instruction to the television 2 (a display apparatus 40 which will be described later). On reception of a response command permitting reception of the pseudo HDR video data from the display apparatus 40, the video I/F unit 205 transmits the pseudo HDR video data generated by the pseudo HDR video generation unit 204 to the display apparatus 40.

A control unit 206 controls the functions of the imaging apparatus 20. For example, a control for reading, from the storage unit 203, a pseudo HDR file designated by the user is executed. On the basis of device information of the display apparatus 40 received via the video I/F unit 205, the control unit 206 transmits various control information to the pseudo HDR video generation unit 204.

Figure 3:
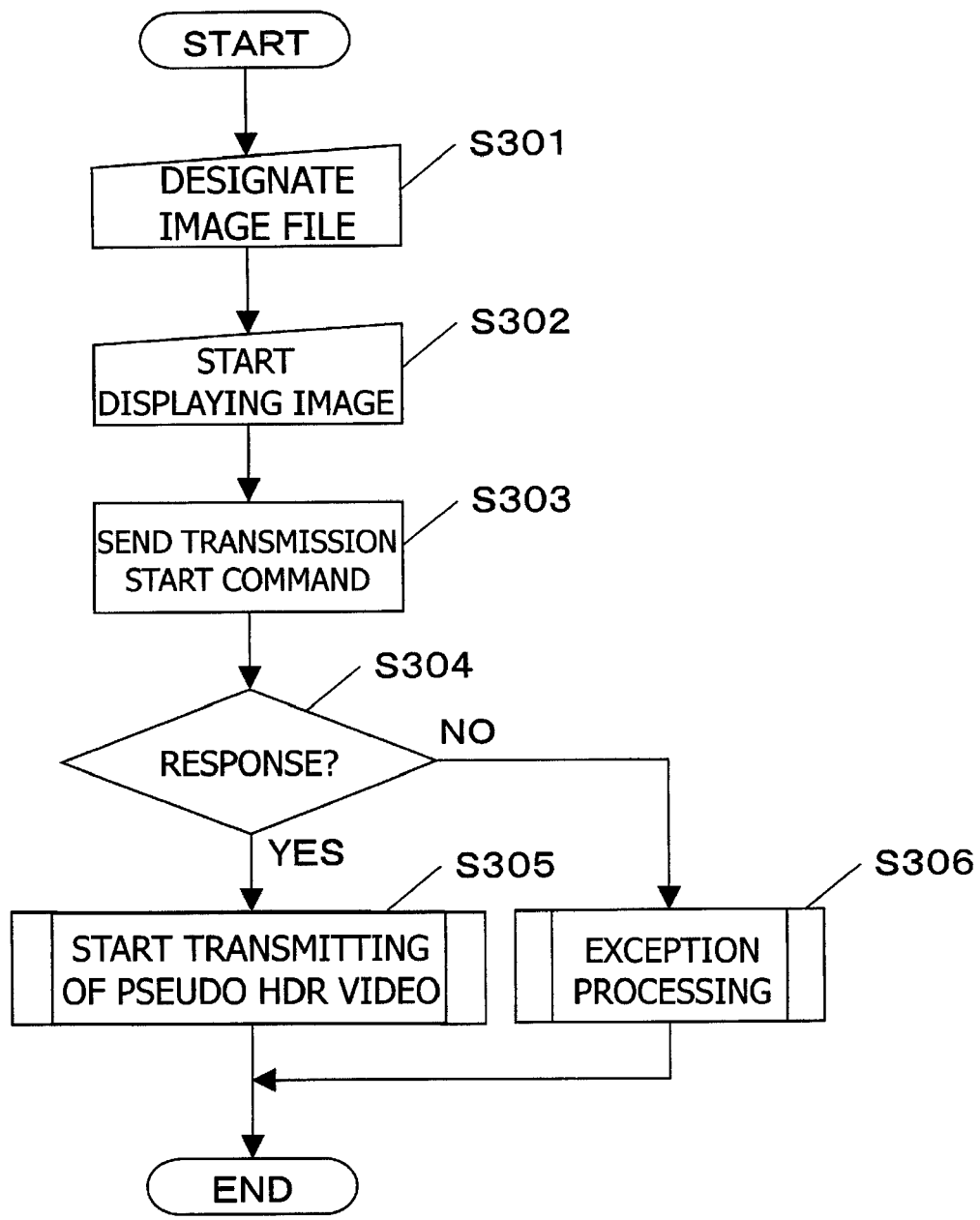
FIG. 3 is a diagram illustrating a video output process of the video output apparatus according to the embodiment.

FIG. 3 is a flowchart showing the flow of the process (video output process) performed when the imaging apparatus 20 outputs the pseudo HDR video data. It is assumed that a pseudo HDR file has been stored in the storage unit 203 in the imaging apparatus 20 at the time of start of the process of FIG. 3. It is assumed that the imaging apparatus 20 is connected to the display apparatus 40 via an HDMI cable.

First, when a pseudo HDR file which is desired to be displayed on the display apparatus 40 is designated by a user operation (S301), the control unit 206 starts a process for displaying video data generated from the designated pseudo HDR file (S302).

Next, when "start of transmission of pseudo HDR video data" is instructed by the user, the video I/F unit 205 transmits a transmission start command indicative of the instruction to the display apparatus 40 via the HDMI cable (S303).

When the video I/F unit 205 receives a response command to the transmission start command from the display apparatus 40 (YES in S304), the display apparatus 40 regards the response command as corresponding to transmission of pseudo HDR video data. Then, transmission of the pseudo HDR video data starts (S305).

On the other hand, when a response command to the transmission start command is not transmitted from the display apparatus 40, the video I/F unit 205 assumes that the display apparatus 40 does not conform with transmission of the pseudo HDR video data and performs an exception processing (S306). As the exception processing, for example, it is sufficient to output video data including a message or an image for notifying the user of the fact that the display apparatus 40 does not conform with displaying the pseudo HDR video data. When image data of correct exposure (correct brightness) is prepared in advance, video data may be generated from the image data and output to the display apparatus 40.

Figure 4:
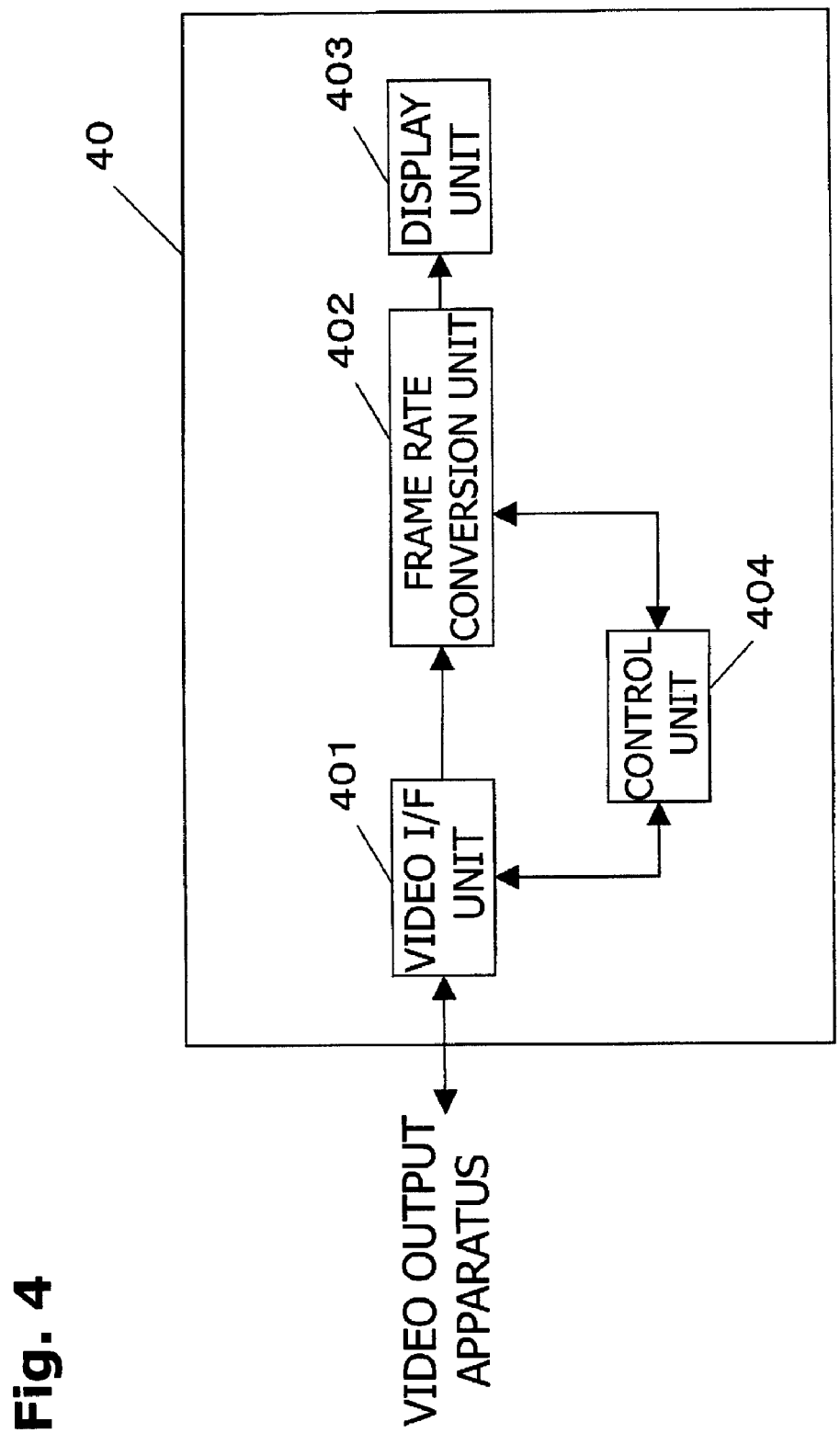
FIG. 4 is a diagram illustrating a schematic configuration of the display apparatus according to the embodiment.

FIG. 4 is a block diagram illustrating a schematic configuration of the television 2 (display apparatus 40). In FIG. 4, only blocks necessary for describing the present invention are shown.

When the transmission start command of the pseudo HDR video data is received from the imaging apparatus 20, a video I/F unit 401 transmits a response command for notifying the imaging apparatus 20 of a transmittable state. The video I/F unit 401 transmits the received transmission start command to a control unit 404. The video I/F unit 401 transmits video data received from the imaging apparatus 20 to a frame rate conversion unit 402.

The frame rate conversion unit 402 converts input video data (first video data having a first frame rate) to second video data having a second frame rate. It is assumed that the second frame rate is a frame rate which is n times as high as the first frame rate (n denotes an integer of two or larger). The details of the frame rate conversion unit 402 will be described later.

A display unit 403 displays the second video data input from the frame rate conversion unit 402. As the display unit 403, various displays such as a display having a plurality of electron emission elements, a liquid crystal display, a plasma display, and an organic EL display and the like can be used.

The control unit 404 calculates the multiplying factor "n" of the frame rate converting process from the values of the frame rate of the display unit 403 and the frame rate of the input video data, and transmits it to the frame rate conversion unit 402. According to reception of the transmission start command of the pseudo HDR video transmitted from the video I/F unit 401, a signal for executing the pseudo HDR frame rate converting process is generated. The pseudo HDR frame rate converting process will be described later.

Figure 5:
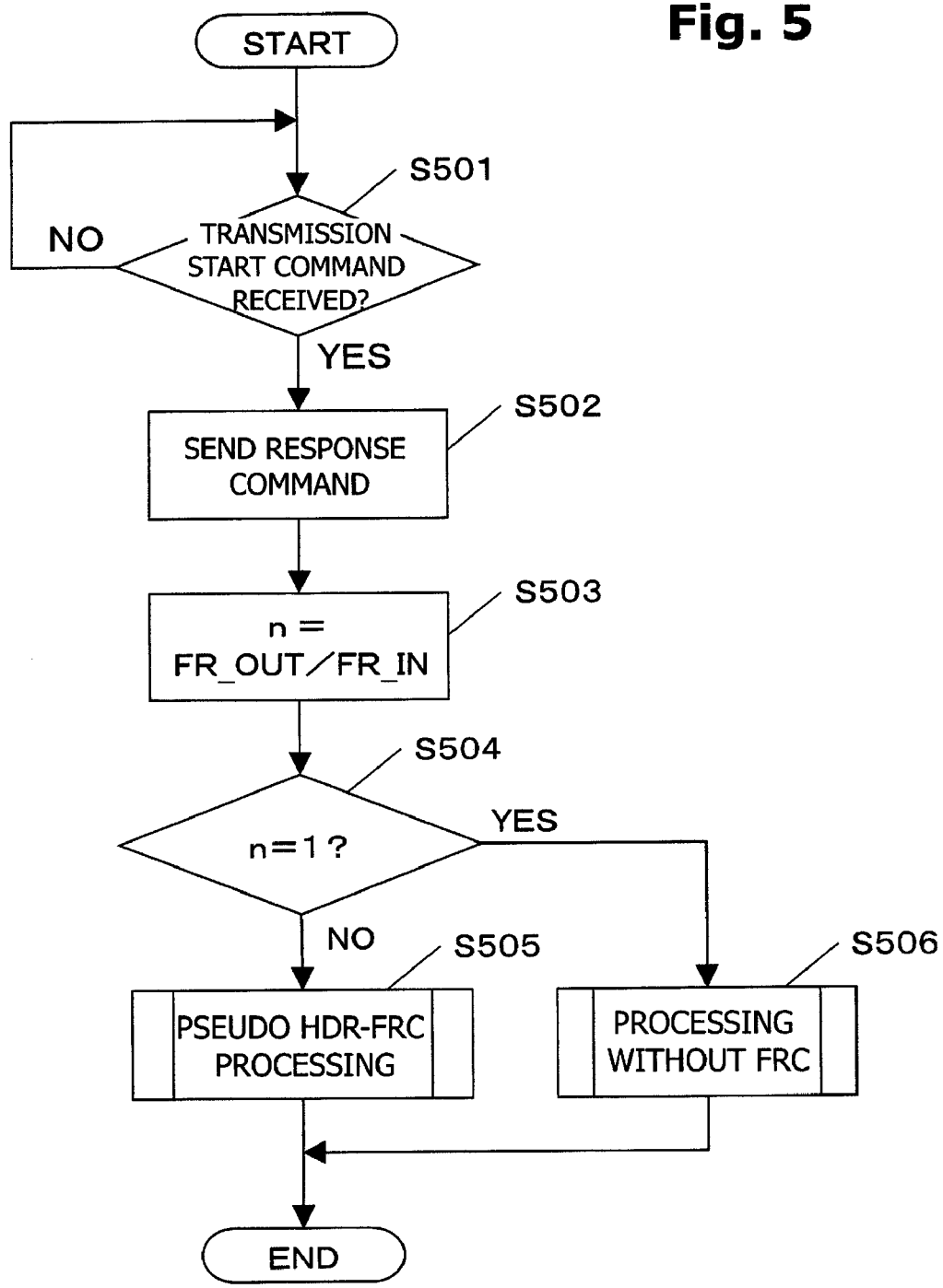
FIG. 5 is a diagram illustrating a video display process of the display apparatus according to a first embodiment.

FIG. 5 is a flowchart illustrating the flow of process (video displaying process) performed when the display apparatus 40 displays the pseudo HDR video data. It is assumed that the display apparatus 40 is connected to the imaging apparatus 20 via an HDMI cable at the beginning of the process shown in FIG. 5.

First, the display apparatus 40 waits until the transmission start command of the pseudo HDR video data from the imaging apparatus 20 is input (S501). The video I/F unit 401 receives the transmission start command (YES in S501) and transmits a response command in response to the command to the imaging apparatus 20 (S502). Concurrently with the process of S502, the control unit 404 generates a signal for executing the pseudo HDR frame rate converting process. When the transmission start command is not input while video data is input, the display apparatus 40 performs a conventional frame rate converting process illustrated in FIGS. 11A and 11B onto the input video data. That is, when the transmission start command is received, the kind of the frame rate converting process is switched from the conventional one to the pseudo HDR frame rate converting process. As a result, if the first video data is the pseudo HDR video data, the frame rate conversion unit 402 performs the pseudo HDR frame rate converting process on the first video data. If the first video data is not the pseudo HDR video data, the conventional frame rate converting process is performed onto the first video data.

When the frame rate conversion unit 402 performs the pseudo HDR frame rate converting process, the display unit 403 may display a message or an image indicating that video data subjected to the frame rate converting process in such a method is displayed. For example, when pseudo HDR video data is transmitted, the display unit 403 may display a message or an image indicating that the transmission is to start. With the message or the image, the user can clearly know that video data to be transmitted is pseudo HDR video data, and a video to be displayed is a video whose frame rate is converted by the pseudo HDR frame rate converting process.

Next, the control unit 404 calculates the multiplying factor "n" of the frame rate converting process from the values of a frame rate (FR_OUT) of the display unit 403 and a frame rate (a first frame rate, FR_IN) of the first video data (S503). More specifically, "n" is set by dividing FR_OUT by FR_IN. When the value of "n" is 1 (YES in S504), the first frame rate and the frame rate of the display unit 403 are equal to each other. Consequently, the control unit 404 instructs the frame rate conversion unit 402 to display the first video data on the display unit 403 without performing the frame rate converting process on the first video data (S506). On the other hand, when the value of "n" is not 1 (NO in S504), the frame rate converting process has to be performed on the first video data. Consequently, the control unit 404 instructs the frame rate conversion unit 402 to perform the pseudo HDR frame rate converting process on the first video data (S505).

Figure 6:
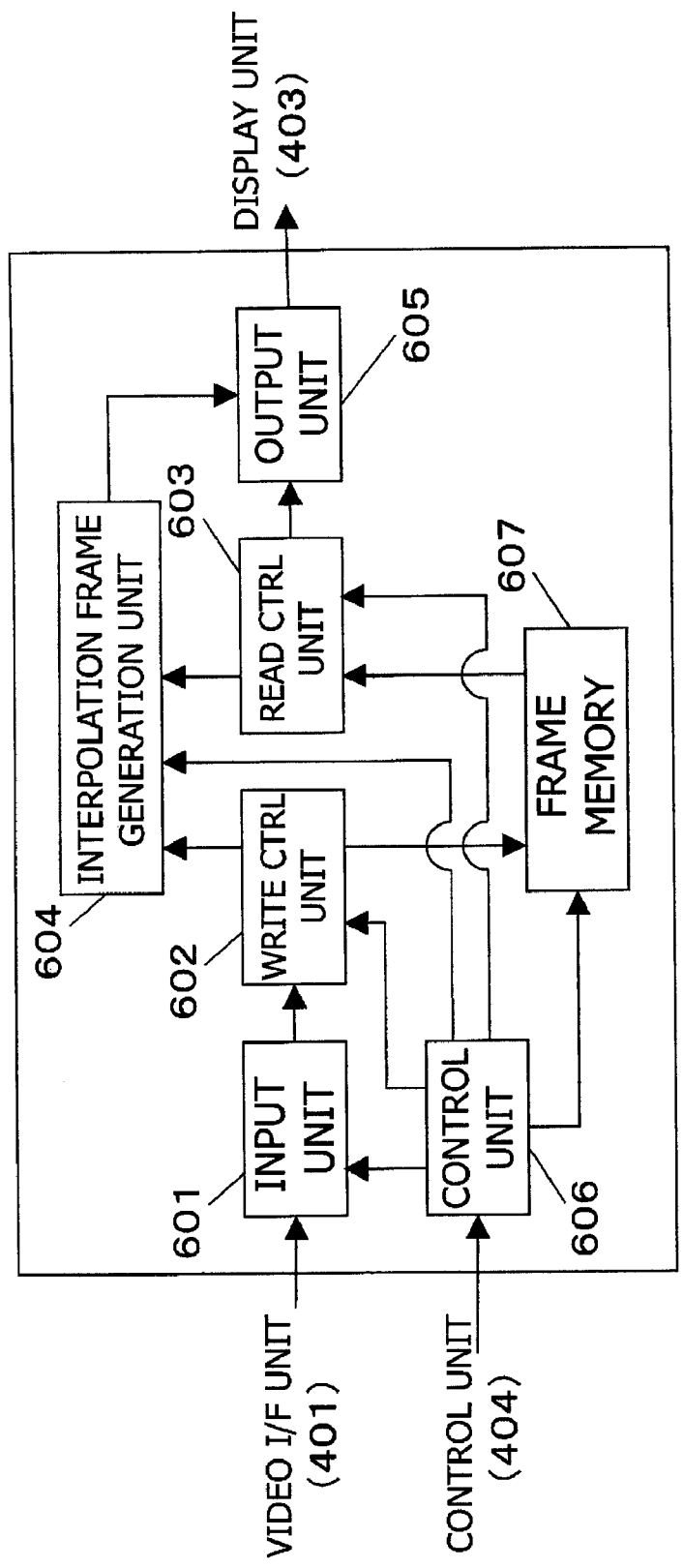
FIG. 6 is a diagram illustrating details of a configuration of a frame rate conversion unit according to the embodiment.

The pseudo HDR frame rate converting process will be described with reference to FIGS. 6 to 9 below. FIG. 6 is a block diagram illustrating a detailed configuration of the frame rate conversion unit 402 illustrated in FIG. 4.

The input unit 601 receives the first video data from the video I/F unit 401 and outputs it to a write control unit 602.

The write control unit 602 writes image data of one frame (frame image data) to be output from an input unit 601 into a frame memory 607 according to a control signal from a control unit 606.

A read control unit 603 reads the frame image data from the frame memory 607 and outputs it to an interpolation frame generation unit 604 and an output unit 605 according to the control signal from the control unit 606.

The interpolation frame generation unit 604 generates an interpolation frame (interpolation frame image data) based on the frame image data read from the frame memory 607 via the read control unit 603.

The output unit 605 reads the frame image data from the frame memory 607 via the read control unit 603 according to a control signal from the control unit 606, and outputs it to the display unit 403 at a second frame rate. The interpolation frame image data is read from the interpolation frame generation unit 604 and output at the second frame rate to the display unit 403. Consequently, the video data (second video data) subjected to the frame rate converting process is output to the display unit 403.

The control unit 606 controls various functions of the frame rate conversion unit 402 according to a control signal from the control unit 404. The function of the control unit 606 may be provided for the control unit 404.

Figure 7A:
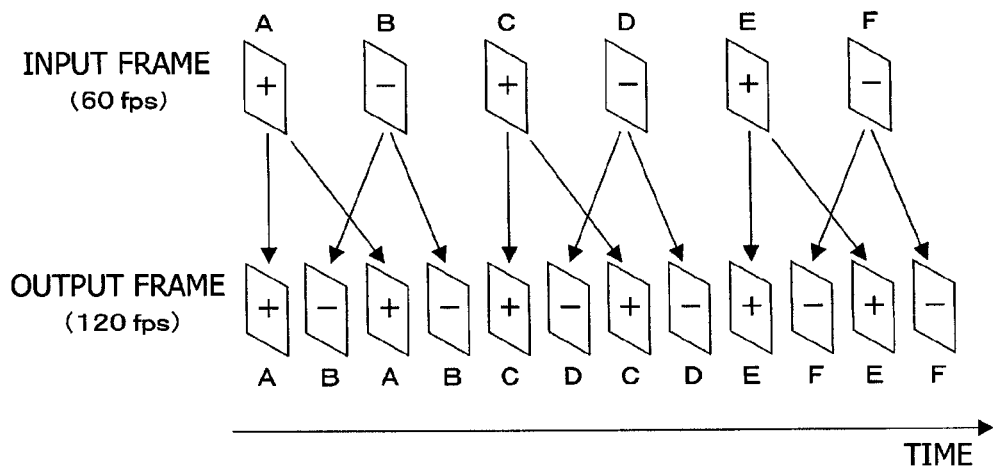
FIGS. 7A and 7B are schematic diagrams for describing a pseudo HDR-FRC.

FIG. 7A is a schematic view for describing a pseudo HDR frame rate converting process generating no interpolation frame (pseudo HDR-FRC: a first frame rate converting process). According to the method of FIG. 7A, two successive frame images (input frames) in first video data are set as a frame image group. The frame image group is output successively "n" times at a second frame rate (a frame image which is output will be called an output frame). The first video data is thereby converted to second video data. In the example of FIG. 7A, FR_IN is 60 fps, and FR_OUT is 120 fps. Since FR_OUT is twice as large as FR_IN (n=2), the above frame image group is output twice successively. A more specific description will be given below. In the diagrams, "+" denotes a frame of an overexposed image, and "−" denotes a frame of an underexposed image.

Figure 8A:
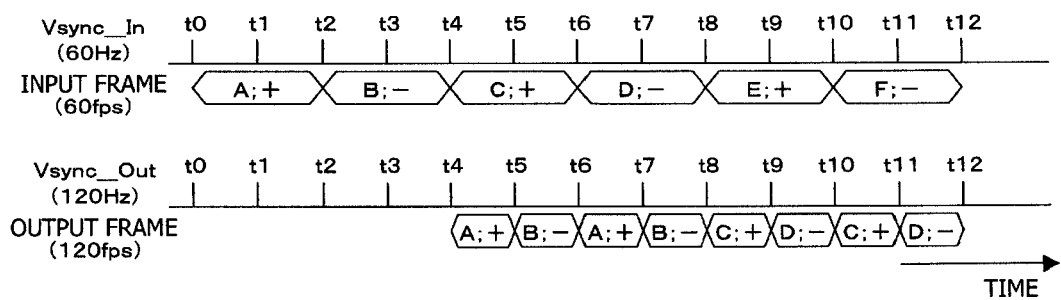
FIGS. 8A and 8B are diagrams illustrating output timings of a frame image in the pseudo HDR-FRC.

FIG. 8A is a timing chart for illustrating the timings of outputting the frame image data when the frame rate conversion unit 402 performs the pseudo HDR frame rate converting process of FIG. 7A. Vsync_In and Vsync_Out in the diagram indicate vertical synchronization signals. The frame image data is input every Vsync_In (60 Hz) and is output every Vsync_Out (120 Hz).

FIGS. 9A to 9F are image diagrams illustrating an example of frame image data written in the frame memory 607 and frame image data read from the frame memory 607 when performing the pseudo HDR frame rate converting process of FIG. 7A.

Figure 9A:
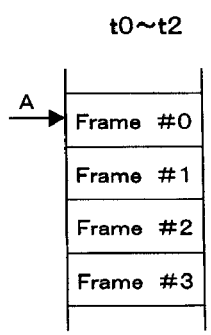
FIGS. 9A to 9F are diagrams illustrating a state of a frame memory in the pseudo HDR-FRC.
Figure 9B:
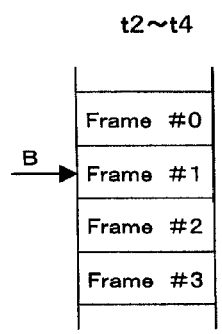

As shown in FIG. 8A, frame image data A of FIG. 7A (data of the frame of the overexposed image) is input in a period of time t0 to t2 (1/60 sec). The input frame image data A is written in a predetermined region #0 in the frame memory 607 as shown in FIG. 9A. In a period of time t2 to t4 (1/60 sec), similarly, frame image data B (data of the frame of the underexposed image) is input and written in a region #1 in the frame memory 607.

Figure 9C:
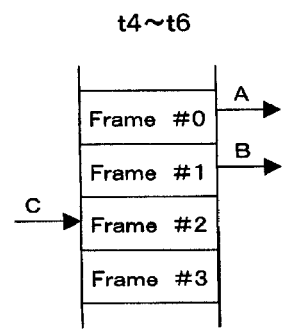

Next, in a period of time t4 to t5 (1/120 sec), as shown in FIG. 8A, the frame image data A written in the period of time t0 to t2 is read from the region #0 in the frame memory 607 and output. In a period of time t5 to t6 (1/120 sec), the frame image data B written in the period of time t2 to t4 is read from the region #1 in the frame memory 607 and output. In the period of time t4 to t6, as shown in FIG. 9C, frame image data C (data of the frame of the overexposed image) is written in a region #2 in the frame memory 607.

Figure 9D:
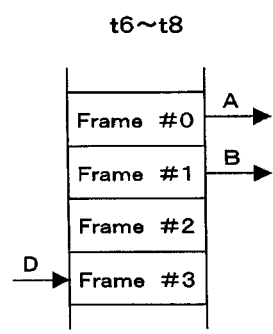

In a period of time t6 to t8 (1/60 sec), as shown in FIG. 8A, the frame image data A and B are read in order from the regions #0 and #1 in the frame memory 607 and output. In the period of time t6 to t8, as shown in FIG. 9D, frame image data D (data of the frame of the underexposed image) is written in a region #3 in the frame memory 607.

Figure 9E:
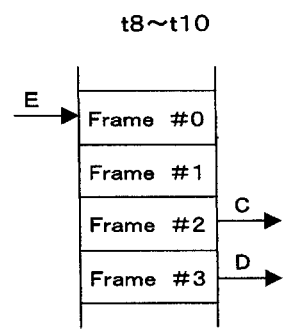
Figure 9F:
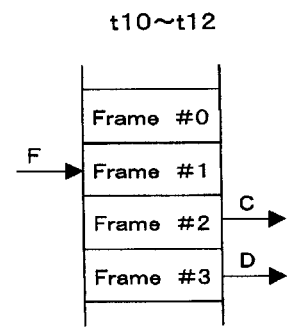

After that, similarly, in a period of time t8 to t10, the frame image data C and D are output in order and frame image data E is written in the frame memory (FIG. 9E). In a period of time t10 to t12, the frame image data C and D are output in order, and frame image data F is written in the frame memory (FIG. 9F).

By repeating such processes, as shown in FIGS. 7A and 8A, the arrangement of frame images of the second image data can be set as "light, dark, light, dark, light . . . ". Consequently, when the pseudo HDR video data is input, the frame rate converting process can be performed without causing a deterioration in a visual effect such as an HDR effect, and a viewing environment comfortable for the user can be realized.

When FR_IN is 60 fps and FR_OUT is 240 fps, n=4. It is therefore sufficient to output a frame image group made of two successive frame images in the first video data four times in a row at the second frame rate.

Figure 7B:
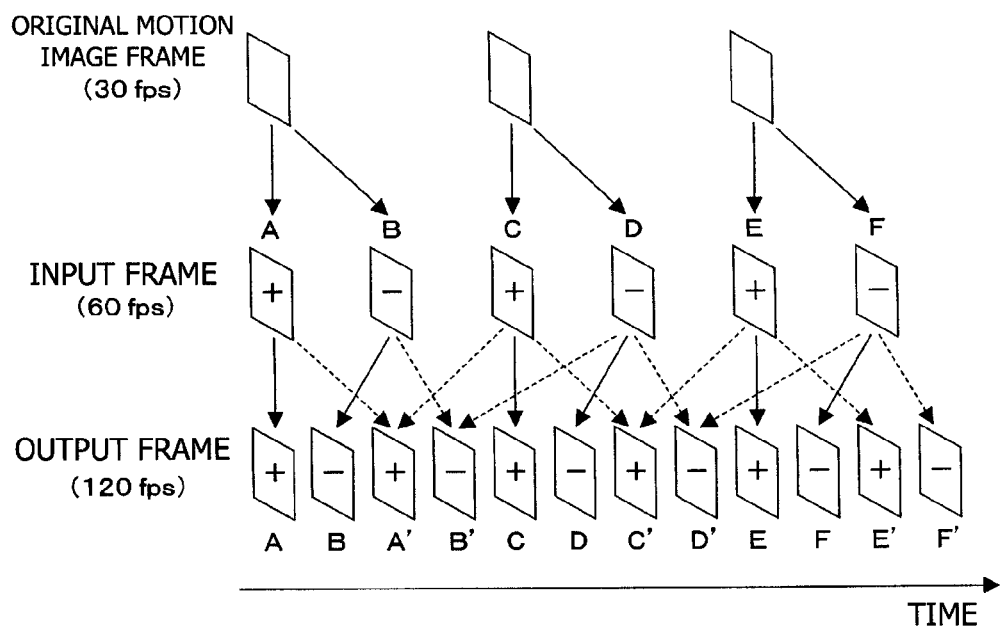

FIG. 7B is a schematic view for describing a pseudo HDR frame rate converting process using an interpolation frame (a second frame rate converting process). According to the method of FIG. 7B, the i-th frame image (where i denotes an integer of 1 or larger) and the i+1th frame image in the first video data are output in order at the second frame rate. After that, an interpolation frame image is generated from each of a frame image pair made of the i-th frame image and the i+2th frame image of the first video data, and a frame image pair of the i+1th frame image and the i+3th frame image of the first image data. The two interpolation frame images are output in order at the second frame rate. As described above, by executing the process of generating two interpolation frame images and outputting them in order at the second frame rate (n−1) times, the first video data is converted to the second video data.

In the example of FIG. 7B, the imaging apparatus 20 generates an image of the overexposed frame and an image of the underexposed frame from each frame image of moving image data (original moving image frame). The imaging apparatus 20 sets the two frame images as a set, and outputs first video data in which the frame images are arranged in order of "light, dark, light, dark . . . " to the display apparatus 40. Therefore, pieces of the frame image data A and B, C and D, and E and F to be input to the display apparatus 40 are the pieces of the frame image data having the same content and different brightnesses. In the example of FIG. 7B, it is assumed that the frame image data A, C, and E are data of frames of the overexposed images, and the frame image data B, D, and F are data of frames of the underexposed images.

Figure 8B:
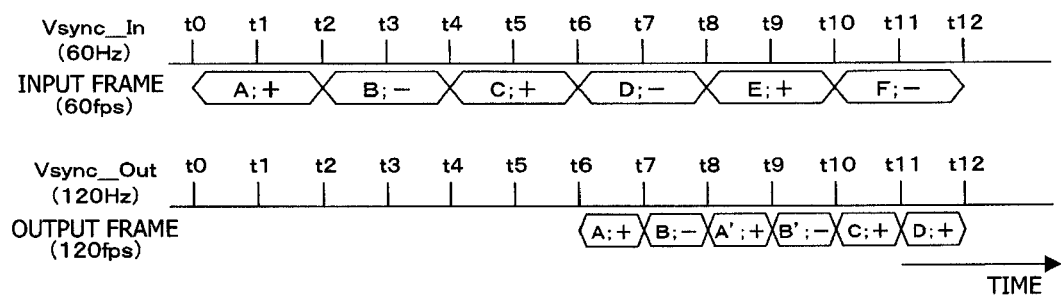

FIG. 8B is a timing chart for illustrating the timings of outputting the frame image data when the frame rate conversion unit 402 performs the pseudo HDR frame rate converting process of FIG. 7B. The pseudo HDR frame rate converting process of FIG. 7B will be described more specifically below with reference to FIG. 8B.

As shown in FIG. 8B, in the period of time t0 to t2, the period of time t2 to t4, and the period of time t4 to t6 (in each of the periods, 1/60 sec), the frame image data A, B, and C are input, respectively. The frame image data A, B, and C are written in predetermined regions in the frame memory 607.

In the period of time t6 to t8 (1/60 sec), the frame image data A and B written in the period of time t0 to t2 and the period of time t2 to t4 are read in order from the frame memory 607 and are output. Frame image data D is input and written in the frame memory 607.

In the period of time t8 to t9 (1/120 sec), the frame image data A and C written in the time t0 to t2 and the time t4 to t6, respectively, are read from the frame memory 607. By the interpolation frame generation unit 604, interpolation frame image data A' is generated from the frame image data A and C and is output. Since both of the frame image data A and C are data of the frames of the overexposed images, the interpolation frame image data A' generated by using them becomes data of the frame of the overexposed image. The interpolation frame image data A' may be generated before time t8.

In the period of time t9 to t10 (1/120 sec), the frame image data B and D written in the period of time t2 to t4 and time t6 to t8, respectively, are read from the frame memory 607. By the interpolation frame generation unit 604, interpolation frame image data B' is generated from the frame image data B and D and is output. Since both of the frame image data B and D are data of the frames of the underexposed images, the interpolation frame image data B' generated by using them becomes data of the frame of the underexposed image. The interpolation frame image data B' may be generated before time t9.

After that, similarly, in a period of time t10 to t12, the frame image data C and D are output as it is. In a period of time t12 to t13 (not shown), an interpolation frame image is generated by using the frame image data C and E and is output. In a period of time t13 to t14 (not shown), an interpolation frame image is generated by using the frame image data D and F and is output.

By generating an interpolation frame image from two frame images having similar brightness levels, frame images of the second video data can be set as "light, dark, light, dark, light, ...". Preferably, the interpolation frame image data is generated according to time in a video (time position in a frame image). When n is 2 or larger, for example, when n=4, the process of outputting two interpolation frame images is repeated three times. More specifically, two interpolation frame image data A' and B' generated from the frame image data A and C and the frame image data B and D are output three times in a row. In this case, preferably, two interpolation frame image data A' and B' which are output first are generated by increasing the weight of the frame image data A and B. Preferably, two interpolation frame image data A' and B' output at the third time are generated by increasing the weight of the frame image data C and D, respectively. As a result, video data capable of expressing a smoother movement is obtained.

When the first video data is not pseudo HDR video data, it is unnecessary to perform the pseudo HDR frame rate converting process. In the embodiment, when the first video data is not the pseudo HDR video data, the conventional frame rate converting process is performed, so that the correct frame rate converting process can be performed on the first video data.

Which one of the first and second frame rate converting processes is performed as the pseudo HDR frame rate converting process can be selected by the user or may be selected according the details (characteristic) of the first video data. The display apparatus may have either of the functions of performing the first frame rate converting process and the function of performing the second frame rate converting process as the function of performing the pseudo HDR frame rate converting process.

Example 2

Example 2 of the display apparatus according to the embodiment will be described below. Since the configuration and the like of the display apparatus are similar to those of the example 1, the description will not be repeated.

Figure 10:
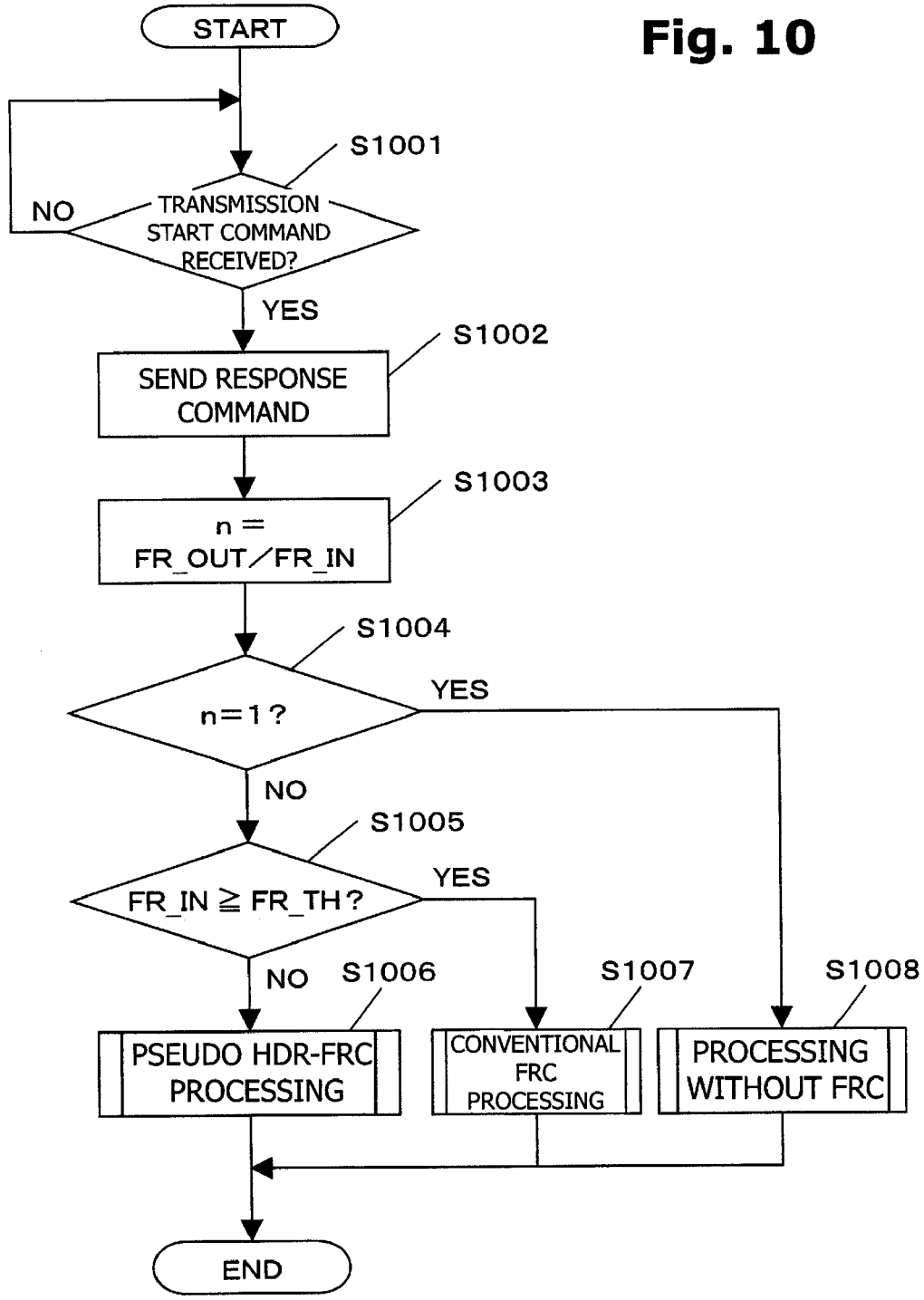
FIG. 10 is a diagram illustrating a video display process of a display apparatus according to a second embodiment.

FIG. 10 is a flowchart showing the flow of processes performed when the display apparatus 40 displays pseudo HDR video data. Since processes in S1001 to S1004 are similar to the processes in the example 1 (the processes in S501 to S504 in FIG. 5), the description of these steps will not be repeated.

When the calculated value of "n" is 1 in S1004, the control unit 404 instructs the frame rate conversion unit 402 to display the first video data on the display unit 403 without performing the frame rate converting process on the first video data (S1008). On the other hand, when the value of "n" is not 1 (NO in S1004), the control unit 404 compares FR_IN with a predetermined threshold (FR_TH) (S1005). When FR_IN is smaller than FR_TH (NO in S1005), the control unit 404 instructs the frame rate conversion unit 402 to perform the pseudo HDR frame rate converting process shown in FIG. 8 on the first video data (S1006). When FR_IN is equal to or larger than FR_TH (YES in S1005), the control unit 404 instructs the frame rate conversion unit 402 to perform the conventional frame rate converting process shown in FIGS. 11A and 11B on the first video data (S1007).

The process will be described using the case of setting FR_IN to 120 fps and setting FR_OUT to 240 fps as an example.

In this case, the value of "n" in the process of S1003 is 2. Consequently, the result of determination in S1004 is NO and the program advances to S1005.

Figure 11A:
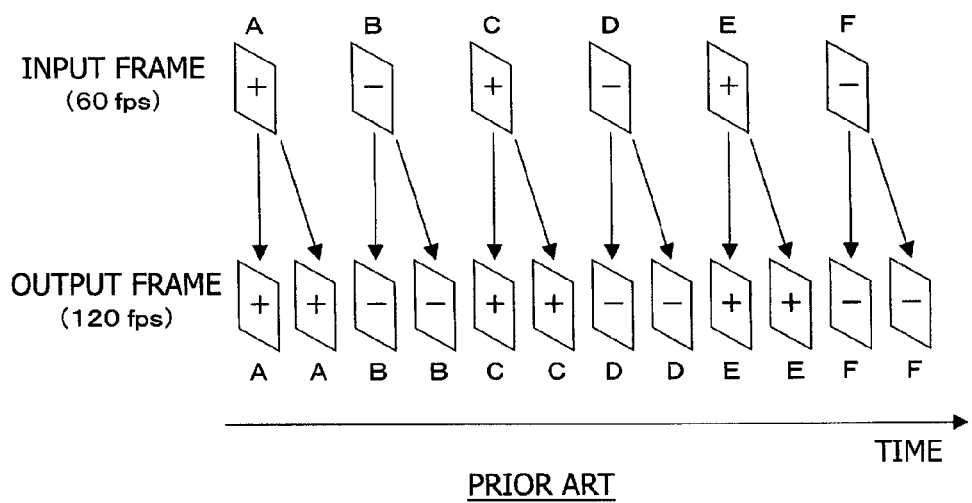
FIGS. 11A and 11B are diagrams illustrating an example of a conventional frame rate converting process.
Figure 11B:
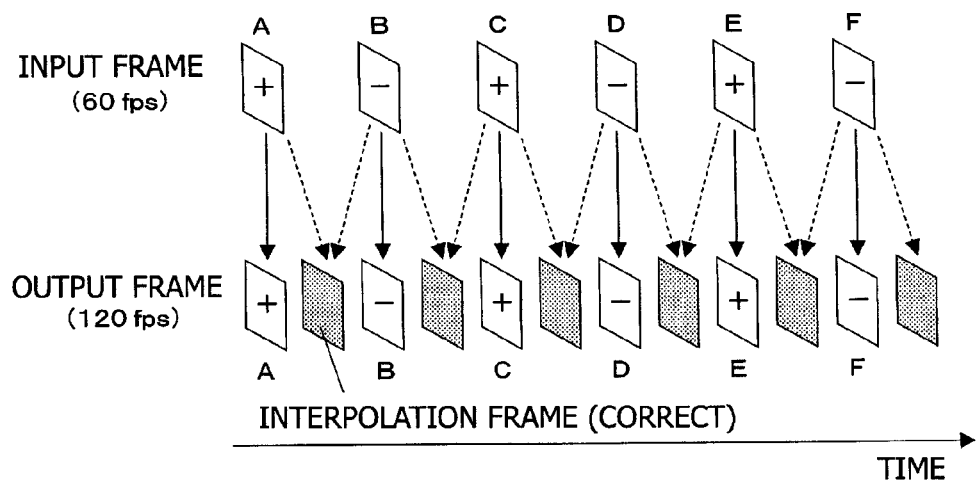

When it is assumed that FR_TH is set to 120 fps, since FR_IN is equal to or larger than FR_TH (YES in S1005), the conventional frame rate converting process is performed as shown in FIGS. 11A and 11B (S1007). FR_TH is the minimum value of the frame rate at which flicker is not recognized by the eyes of a human.

When the frame rate converting process as shown in FIG. 11A is performed in S1007, the arrangement of frame images in the second video data becomes like "light, light, dark, dark, light, ...". That is, "light" and "dark" images are not arranged alternately. However, since the frame rate of the video data to be output is 240 fps, a viewer can have substantially the same feeling as when the viewer watches videos arranged like "light, dark, light, dark, light, ..." at 120 fps.

That is, when the first frame rate is equal to or larger than the threshold FR_TH (for example, 120 fps), it is considered that the viewing environment having a minimum comfort for the viewer can be provided without performing the pseudo HDR frame rate converting process. In the example, by performing the pseudo HDR frame rate converting process only when the first frame rate is lower than the predetermined threshold, the needed resources for the process (for example, frame memory usage) can be considerably reduced.

As described above, according to the display apparatus and the control method thereof according to the embodiment, the frame images of the second video data can be arranged like "light, dark, light, dark, ...". Thus, when the pseudo HDR video data is input, the frame rate converting process can be performed without causing a deterioration in a visual effect such as the HDR effect, and viewing environment comfortable for the user can be realized.

The apparatuses, the interface, and the like according to the embodiment are not limited to those described in the examples 1 and 2. For example, the display apparatus is not limited to the television 2 but may be various display apparatuses such as a monitor for a PC. The display apparatus may not obtain a video from a video output apparatus but may obtain a video from a recording medium such as a DVD or obtain a broadcasted video. The video output apparatus may be a DVD player, a hard disk recorder, or the like, capable of reproducing and outputting a video, or may be built in the display apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-109645, filed on Apr. 28, 2009, which is hereby incorporated by reference herein in its entirety.

What is claimed is:

1. A display apparatus comprising:
    a conversion unit configured to convert first video data having a first frame rate to second video data having a second frame rate, wherein the second frame rate is "n" times as high as the first frame rate ("n" being an integer of two or larger); and
    a display unit configured to display the second video data, wherein, when the first video data is video data of two successive frame images having different brightnesses, the conversion unit performs a first frame rate converting process for converting the first video data to the second video data by outputting a frame image group made of two successive frame images in the first video data "n" times in a row at the second frame rate.

2. The display apparatus according to claim 1, wherein, when the first frame rate is lower than a predetermined threshold, the conversion unit performs the first frame rate converting process.

3. The display apparatus according to claim 1, wherein, when the conversion unit performs the first frame rate converting process, the display unit displays a message and/or an image indicating that video data subjected to the first frame rate converting process is to be displayed.

4. The display apparatus according to claim 1, wherein the conversion unit performs the first frame rate converting process in response to reception of a command to start transmission of the first video data of successive two frame images having different brightnesses, from a video output apparatus for outputting the first video data.

5. A display apparatus comprising:
a conversion unit configured to convert first video data having a first frame rate to second video data having a second frame rate, wherein the second frame rate is "n" times as high as the first frame rate ("n" being an integer of two or larger); and
a display unit configured to display the second video data,
wherein, when the first video data is video data of two successive frame images having different brightnesses, the conversion unit performs a frame rate converting process for converting the first video data to the second video data by outputting an i-th (i being an integer of one or larger) frame image and an i+1th frame image in the first video data in order at the second frame rate, and then, performing a process for generating two interpolation frame images respectively from a frame image pair made of the i-th frame image and the i+2th frame image of the first video data and a frame image pair of the i+1th frame image and the i+3th frame image of the first image data and outputting the two interpolation frame images n−1 times in order at the second frame rate.

6. The display apparatus according to claim 5, wherein, when the first frame rate is lower than a predetermined threshold, the conversion unit performs the frame rate converting process.

7. The display apparatus according to claim 5, wherein, when the conversion unit performs the frame rate converting process, the display unit displays a message and/or an image indicating that video data subjected to the frame rate converting process is to be displayed.

8. The display apparatus according to claim 5, wherein the conversion unit performs the frame rate converting process in response to reception of a command to start transmission of the first video data of successive two frame images having different brightnesses, from a video output apparatus for outputting the first video data.

9. A control method of a display apparatus, comprising:
converting first video data having a first frame rate to second video data having a second frame rate, wherein the second frame rate is "n" times as high as the first frame rate ("n" being an integer of two or larger); and
displaying the second video data,
wherein in the converting of the frame rate, when the first video data is video data of two successive frame images having different brightnesses, a first frame rate converting process for converting the first video data to the second video data is performed by outputting a frame image group made of two successive frame images in the first video data "n" times in a row at the second frame rate.

10. A control method of a display apparatus, comprising:
converting first video data having a first frame rate to second video data having a second frame rate, wherein the second frame rate is "n" times as high as the first frame rate ("n" being an integer of two or larger); and
displaying the second video data,
wherein in the converting the frame rate, when the first video data is video data of two successive frame images having different brightnesses, a frame rate converting process for converting the first video data to the second video data is performed by outputting an i-th (i being an integer of one or larger) frame image and an i+1-th frame image in the first video data in order at the second frame rate, and then, performing a process for generating two interpolation frame images respectively from a frame image pair made of the i-th frame image and the i+2th frame image of the first video data and a frame image pair of the i+1th frame image and the i+3th frame image of the first image data and outputting the two interpolation frame images in order n−1 times at the second frame rate.

* * * * *